(12) United States Patent
Sugihara (10) Patent No.: US 10,566,610 B2
(45) Date of Patent: Feb. 18, 2020

(54) METHOD OF MANUFACTURING NEGATIVE ELECTRODE FOR NON-AQUEOUS ELECTROLYTE SECONDARY BATTERY, AND METHOD OF MANUFACTURING NON-AQUEOUS ELECTROLYTE SECONDARY BATTERY

(71) Applicant: TOYOTA JIDOSHA KABUSHIKI KAISHA, Toyota-shi, Aichi-ken (JP)

(72) Inventor: Atsushi Sugihara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 22 days.

(21) Appl. No.: 15/918,457

(22) Filed: Mar. 12, 2018

(65) Prior Publication Data
US 2018/0277832 A1    Sep. 27, 2018

(30) Foreign Application Priority Data
Mar. 22, 2017  (JP) .................. 2017-056019

(51) Int. Cl.
*H01M 4/04*   (2006.01)
*H01M 4/1393*   (2010.01)
(Continued)

(52) U.S. Cl.
CPC ....... *H01M 4/1393* (2013.01); *H01M 4/0404* (2013.01); *H01M 4/0471* (2013.01);
(Continued)

(58) Field of Classification Search
CPC . H01M 2/14–1686; H01M 4/04–0497; H01M 4/139–1399; H01M 4/36–366;
(Continued)

(56) References Cited

U.S. PATENT DOCUMENTS

2012/0148746 A1*  6/2012  Honda ................... C23C 14/24
                                                        427/255.28
2016/0156016 A1*  6/2016  Umeyama ............. H01M 4/661
                                                        29/623.1
(Continued)

FOREIGN PATENT DOCUMENTS

JP    2002-170556 A    6/2002
JP    2008-159385 A    7/2008
(Continued)

OTHER PUBLICATIONS

JP 2013-161762, English translation (Year: 2013).*

*Primary Examiner* — Jonathan G Leong
*Assistant Examiner* — Kimberly Wyluda
(74) *Attorney, Agent, or Firm* — Oliff PLC (57) ABSTRACT

A method of manufacturing a negative electrode for a non-aqueous electrolyte secondary battery includes the following. A negative electrode composite material layer including a planar region and a side-surface region is formed. An application material is prepared by mixing heat-resistant particles, thermoplastic resin particles, and a solvent. A planar coating film is formed by applying the application material to the planar region and a side-surface coating film is formed by applying the application material to the side-surface region. At least some of the thermoplastic resin particles are molten into a melt by heating the planar coating film at a temperature not lower than a melting point of the thermoplastic resin particles. A negative electrode is manufactured by drying the planar coating film containing the melt and the side-surface coating film containing the thermoplastic resin particles at a temperature lower than the melting point of the thermoplastic resin particles.

7 Claims, 8 Drawing Sheets

(51) Int. Cl.
  *H01M 10/0525*  (2010.01)
  *H01M 10/0585*  (2010.01)
  *H01M 4/62*  (2006.01)
  *H01M 4/02*  (2006.01)

(52) U.S. Cl.
  CPC ....... *H01M 4/628* (2013.01); *H01M 10/0525* (2013.01); *H01M 10/0585* (2013.01); *H01M 2004/027* (2013.01); *H01M 2220/20* (2013.01)

(58) Field of Classification Search
  CPC ............. H01M 4/1393; H01M 4/0404; H01M 4/0471; H01M 4/628; H01M 2004/027; H01M 2200/20; H01M 10/0525; H01M 10/0585
  See application file for complete search history.

(56) References Cited

U.S. PATENT DOCUMENTS

2016/0181652 A1* 6/2016 Umehara .......... H01M 10/0431
                                                          429/94
2019/0067702 A1* 2/2019 Son ...................... H01M 4/505

FOREIGN PATENT DOCUMENTS

| | | |
|---|---|---|
| JP | 2010-056037 A | 3/2010 |
| JP | 2013-101867 A | 5/2013 |
| JP | 2013-161762 A | 8/2013 |
| KR | 10-2016-0075345 A | 6/2016 |

\* cited by examiner

METHOD OF MANUFACTURING NEGATIVE ELECTRODE FOR NON-AQUEOUS ELECTROLYTE SECONDARY BATTERY, AND METHOD OF MANUFACTURING NON-AQUEOUS ELECTROLYTE SECONDARY BATTERY

This nonprovisional application is based on Japanese Patent Application No. 2017-056019 filed with the Japan Patent Office on Mar. 22, 2017, the entire contents of which are hereby incorporated by reference.

BACKGROUND

Field

The present disclosure relates to a method of manufacturing a negative electrode for a non-aqueous electrolyte secondary battery and a method of manufacturing a non-aqueous electrolyte secondary battery.

Description of the Background Art

Japanese Patent Laying-Open No. 2013-161762 discloses a negative electrode for a non-aqueous electrolyte secondary battery (which may hereinafter be abbreviated as a "negative electrode") in which a coating film is formed in a side-surface region of a negative electrode composite material layer.

SUMMARY

A negative electrode composite material layer is impregnated with an electrolyte. The negative electrode composite material layer expands and contracts with charging and discharging. The electrolyte is considered to flow out of a side-surface region of the negative electrode composite material layer as a result of repeated expansion and contraction of the negative electrode composite material layer. A resistance is considered to increase due to outflow of the electrolyte.

In Japanese Patent Laying-Open No. 2013-161762, the coating film is formed in the side-surface region of the negative electrode composite material layer. The coating film contains a high-polymer material and suppresses permeation with the electrolyte. Namely, the coating film can function as a film which suppresses outflow of the electrolyte.

A technique for forming a heat-resistant film in a planar region of a negative electrode composite material layer has also been known. The heat-resistant film contains a heat-resistant material (heat-resistant particles such as inorganic particles). The planar region is opposed to a positive electrode composite material layer. A porous film through which the electrolyte can permeate is provided as the heat-resistant film so as not to block exchange of charge carriers (such as lithium ions) between the positive electrode composite material layer and the negative electrode composite material layer.

Therefore, it is difficult to use a material in common between the heat-resistant film arranged in the planar region and an outflow suppression film arranged in the side-surface region. In order to provide both of the heat-resistant film and the outflow suppression film on the negative electrode composite material layer, application materials different between the planar region and the side-surface region should be applied.

An object of the present disclosure is to provide both of a heat-resistant film and an outflow suppression film on a negative electrode composite material layer in a simplified manner.

Technical features and functions and effects of the present disclosure will be described below. A functional mechanism of the present disclosure, however, includes presumption. The scope of claims should not be limited by whether or not the functional mechanism is correct.

[1] A method of manufacturing a negative electrode for a non-aqueous electrolyte secondary battery includes (a1) to (a5) as follows:

(a1) Forming a negative electrode composite material layer including a planar region and a side-surface region;

(a2) Preparing an application material by mixing heat-resistant particles, thermoplastic resin particles, and a solvent;

(a3) Forming a planar coating film by applying the application material to the planar region and forming a side-surface coating film by applying the application material to the side-surface region;

(a4) Melting at least some of the thermoplastic resin particles into a melt by heating the planar coating film at a temperature not lower than a melting point of the thermoplastic resin particles; and (a5) Manufacturing a negative electrode by drying the planar coating film containing the melt and the side-surface coating film containing the thermoplastic resin particles at a temperature lower than the melting point of the thermoplastic resin particles.

According to the manufacturing method in [1], an application material common between the planar region and the side-surface region of the negative electrode composite material layer is used. The application material contains thermoplastic resin particles. Initially, the application material applied to the planar region (the planar coating film) is heated at a temperature not lower than the melting point of the thermoplastic resin particles. At least some of the thermoplastic resin particles are thus molten into a melt. Namely, the thermoplastic resin particles are converted from solid to liquid. A resin is considered to expand in conversion from solid to liquid.

Then, the planar coating film and the side-surface coating film are dried at a temperature lower than the melting point of the thermoplastic resin particles. The melt is thus cooled and solidified. The resin is considered to contract in returning from liquid to solid. Consequently, pores are considered to be provided in the dried planar coating film. Namely, the planar coating film can be a porous film. The planar coating film contains heat-resistant particles. Therefore, the planar coating film can function as the heat-resistant film. On the other hand, the side-surface coating film can be dried without the thermoplastic resin particles being molten into a melt. Therefore, provision of pores in the side-surface coating film can presumably be suppressed. Namely, the side-surface coating film can function as a film which suppresses outflow of the electrolyte.

As set forth above, both of the heat-resistant film and the outflow suppression film are provided on the negative electrode composite material layer in a simplified manner.

[2] The planar coating film may be heated at the temperature not lower than the melting point of the thermoplastic resin particles through induction heating. Induction heating (IH) is suitable for local heating. By adopting IH, the planar coating film can selectively be heated. Namely, heating of the side-surface coating film can be suppressed. Therefore, improvement of an effect to suppress outflow of the electrolyte is expected.

[3] The planar coating film containing the melt and the side-surface coating film containing the thermoplastic resin particles may be dried at the temperature lower than the melting point of the thermoplastic resin particles with hot air.

With IH, a temperature of the planar coating film can be increased to a temperature not lower than the melting point of the thermoplastic resin particles in a short period of time. By thereafter changing a drying method from IH to hot air, a high temperature to such an extent as volatilizing a solvent can be maintained while a temperature of the planar coating film is lowered to a temperature lower than the melting point. Reduction in required time is thus expected.

[4] The negative electrode composite material layer may be formed of wet granules.

In general, the negative electrode composite material layer is formed of slurry. Slurry is low in solid content. Namely, slurry is high in content of a solvent. Therefore, unless the negative electrode composite material layer is dried, it is difficult to apply the application material to the negative electrode composite material layer.

In contrast, wet granules are high in solid content. Namely, wet granules are low in content of a solvent. Therefore, an application material can be applied to the negative electrode composite material layer formed of wet granules even though the negative electrode composite material layer is not dried (with the negative electrode composite material layer remaining wet). According to this feature, the planar coating film, the side-surface coating film, and the negative electrode composite material layer can be dried together. Therefore, the number of times of drying throughout the entire process for manufacturing a negative electrode can be decreased.

[5] A method of manufacturing a non-aqueous electrolyte secondary battery includes (A) to (D) as follows:

(A) The negative electrode is manufactured with the method of manufacturing a negative electrode for a non-aqueous electrolyte secondary battery according to any one of [1] to [4] above;

(B) A positive electrode including a positive electrode composite material layer is manufactured;

(C) An electrode group is formed by stacking the positive electrode and the negative electrode such that the positive electrode composite material layer and the planar coating film are opposed to each other; and (D) A non-aqueous electrolyte secondary battery is manufactured by impregnating the electrode group with an electrolyte.

According to the method of manufacturing a non-aqueous electrolyte secondary battery, a rate of increase in resistance in a high-rate cycle can be suppressed because both of the heat-resistant film and the outflow suppression film are provided on the negative electrode composite material layer.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure (which is herein also denoted as the "present embodiment") will be described below. The description below, however, does not limit the scope of claims. For example, though a lithium ion secondary battery is described by way of example of a non-aqueous electrolyte secondary battery, the non-aqueous electrolyte secondary battery in the present embodiment should not be limited to the lithium ion secondary battery so long as it is a secondary battery containing a non-aqueous electrolyte. The non-aqueous electrolyte secondary battery in the present embodiment can be, for example, a sodium ion secondary battery.

Dimensional relation of each feature is modified as appropriate in the drawings of the present disclosure for the sake of convenience of illustration. Dimensional relation shown in the drawings of the present disclosure does not show actual dimensional relation.

<Method of Manufacturing Non-Aqueous Electrolyte Secondary Battery>

Figure 1:
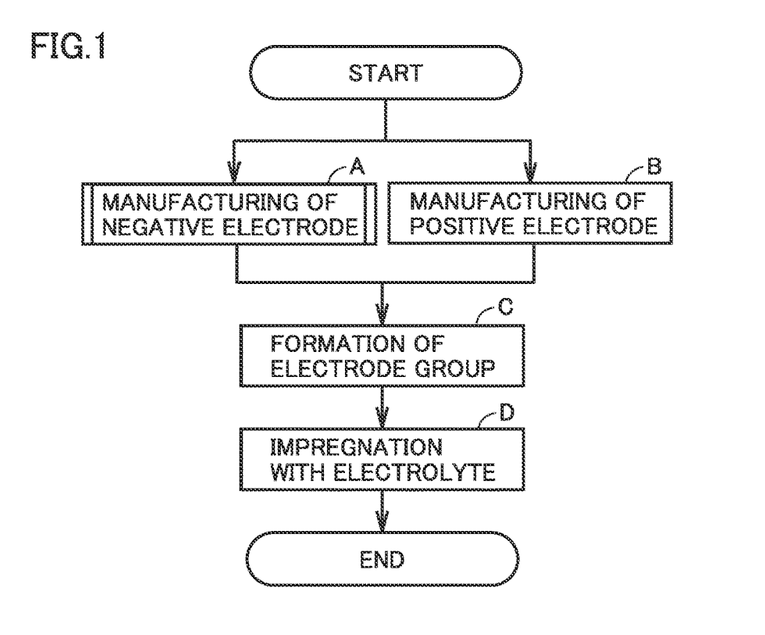
FIG. 1 is a flowchart showing overview of a method of manufacturing a non-aqueous electrolyte secondary battery in the present embodiment.

FIG. 1 is a flowchart showing overview of a method of manufacturing a non-aqueous electrolyte secondary battery in the present embodiment. The method of manufacturing a non-aqueous electrolyte secondary battery in the present embodiment includes "(A) manufacturing of a negative electrode," "(B) manufacturing of a positive electrode," "(C) formation of an electrode group," and "(D) impregnation with an electrolyte." The method of manufacturing a non-aqueous electrolyte secondary battery in the present embodiment will sequentially be described below.

<(A) Manufacturing of Negative Electrode (Method of Manufacturing Negative Electrode for Non-Aqueous Electrolyte Secondary Battery)>

The method of manufacturing a non-aqueous electrolyte secondary battery in the present embodiment includes manufacturing a negative electrode.

Figure 2:
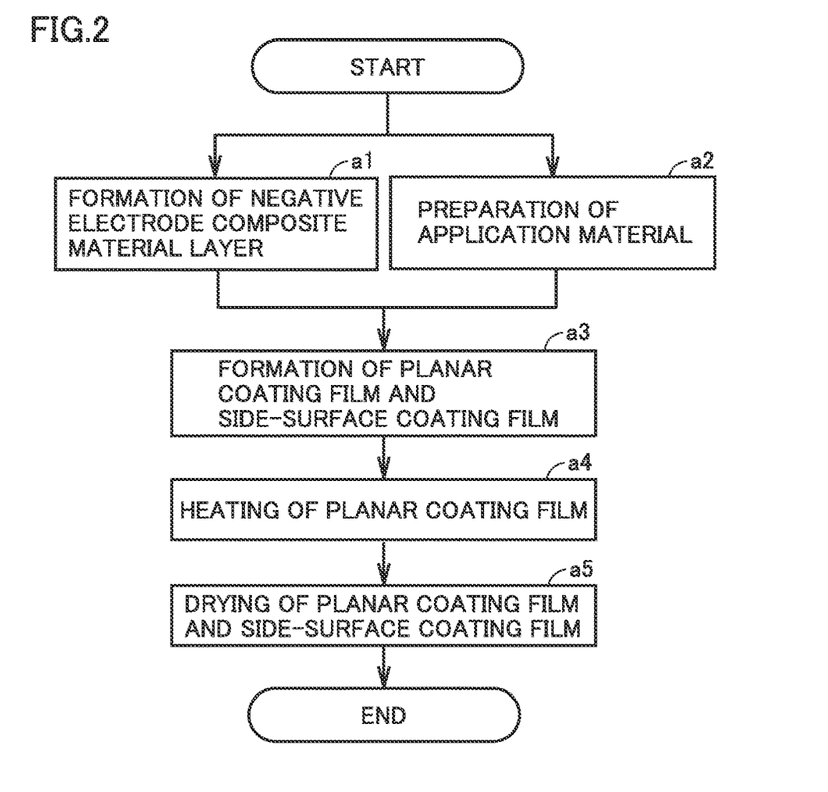
FIG. 2 is a flowchart showing overview of a method of manufacturing a negative electrode for a non-aqueous electrolyte secondary battery in the present embodiment.

FIG. 2 is a flowchart showing overview of a method of manufacturing a negative electrode for a non-aqueous electrolyte secondary battery in the present embodiment. The method of manufacturing a negative electrode for a non-aqueous electrolyte secondary battery in the present embodiment includes "(a1) formation of a negative electrode composite material layer," "(a2) preparation of an application material," "(a3) formation of a planar coating film and a side-surface coating film," "(a4) heating of the planar coating film," and "(a5) drying of the planar coating film and the side-surface coating film."

«(a1) Formation of Negative Electrode Composite Material Layer»

Figure 3:
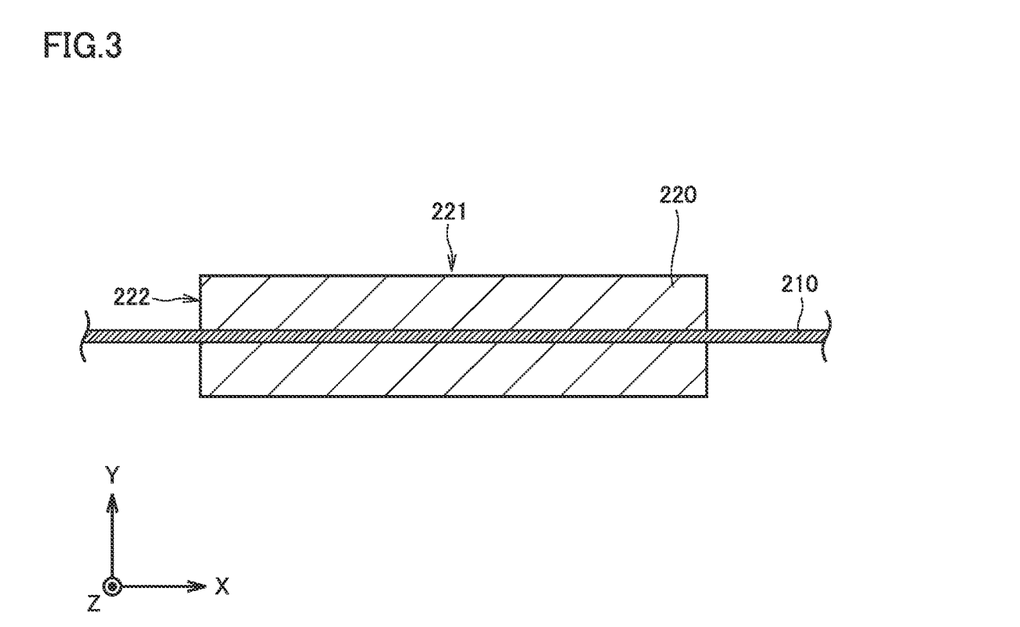
FIG. 3 is a schematic cross-sectional view for illustrating formation of a negative electrode composite material layer.

FIG. 3 is a schematic cross-sectional view for illustrating formation of a negative electrode composite material layer. The method of manufacturing a negative electrode for a non-aqueous electrolyte secondary battery in the present embodiment includes forming a negative electrode composite material layer 220 including a planar region 221 and a side-surface region 222.

Negative electrode composite material layer 220 can be formed on a surface of a negative electrode current collector 210. Negative electrode composite material layer 220 may be formed on both of a front surface and a rear surface of negative electrode current collector 210. Negative electrode composite material layer 220 includes planar region 221 and side-surface region 222. Side-surface region 222 does not have to be perpendicular to planar region 221. Namely, side-surface region 222 may be inclined. For example, a region extending by 2 mm or less from a side end of negative electrode composite material layer 220 may be defined as side-surface region 222.

A method of forming negative electrode composite material layer 220 should not particularly be limited. Negative electrode composite material layer 220 can be formed with a conventionally known method. For example, an application material containing a negative electrode composite material is prepared. The application material may be slurry. Slurry is a particle dispersion liquid obtained by dispersing particles in a solvent. Gaps among particles in slurry are filled with the solvent. Slurry can be prepared by mixing a negative electrode active material, a conductive material, a binder, and a solvent. A general agitator can be used for mixing.

A solid content of slurry can be, for example, from 40 to 60 mass %. A "solid content" represents a ratio in mass of a component other than a solvent. Slurry can be applied to a surface of negative electrode current collector 210, for example, with a die coater and then dried. Negative electrode composite material layer 220 can thus be formed. Negative electrode composite material layer 220 may be compressed after it is dried. Negative electrode composite material layer 220 can be compressed, for example, by a roller.

The application material may be wet granules. Namely, negative electrode composite material layer 220 may be formed of wet granules. Wet granules are an aggregate of granules. In wet granules, gaps among particles are not filled with a solvent. Wet granules can be prepared by mixing a negative electrode active material, a conductive material, a binder, and a solvent. A general agitation granulator can be used for mixing. A solid content of wet granules can be, for example, from 60 to 90 mass % (typically from 65 to 85 mass %). Wet granules are applied to the surface of negative electrode current collector 210, for example, with a roll coater and then dried. Negative electrode composite material layer 220 can thus be formed.

A planar coating film 231 and a side-surface coating film 232 which will be described later can be formed on negative electrode composite material layer 220 formed of wet granules even though it is not dried (see FIG. 4). According to this feature, planar coating film 231, side-surface coating film 232, and negative electrode composite material layer 220 can be dried together. Therefore, the number of times of drying throughout the entire process for manufacturing a negative electrode 200 can be reduced. Planar coating film 231 and negative electrode composite material layer 220 may be compressed together after drying.

Negative electrode composite material layer 220 can be formed to have a thickness, for example, from 10 to 100 μm. A "thickness" of each layer and each film herein can be measured, for example, with a micrometer. A thickness of each layer and each film may be measured, for example, in a micrograph of a cross-section thereof.

Negative electrode composite material layer 220 can be formed to contain, for example, 80 to 99.5 mass % of negative electrode active material, 0 to 15 mass % of conductive material, and 0.5 to 5 mass % of binder. The negative electrode active material should not particularly be limited. The negative electrode active material may be, for example, graphite, soft carbon, hard carbon, silicon, silicon oxide, tin, or tin oxide. Graphite may be natural graphite or artificial graphite. The negative electrode active material can have an average particle size, for example, from 1 to 30 μm. An "average particle size" herein represents a particle size of cumulative 50% from a finer particle side in a particle size distribution on a volume basis measured with a laser diffractive scattering method.

The conductive material should not particularly be limited either. The conductive material may be, for example, acetylene black, thermal black, furness black, vapor-grown carbon fiber (VGCF), and graphene flakes. When a negative electrode active material high in electron conductivity such as graphite is employed, a conductive material may not be used. The binder should not particularly be limited. The binder may be, for example, carboxymethyl cellulose (CMC), styrene-butadiene rubber (SBR), and polyacrylic acid (PAA). For each of the negative electrode active material, the conductive material, and the binder, a single type may be used alone or two or more types may be used as being combined. A solvent can be selected as appropriate depending on a type of the binder. For example, water can be used for CMC.

Negative electrode current collector 210 may be formed, for example, from a copper (Cu) foil. The Cu foil may be a pure Cu foil or a Cu alloy foil. Negative electrode current collector 210 may have a thickness, for example, from 5 to 30 μm.

«(a2) Preparation of Application Material»

The method of manufacturing a negative electrode for a non-aqueous electrolyte secondary battery in the present embodiment includes preparing an application material by mixing heat-resistant particles, thermoplastic resin particles, and a solvent. The application material here is a precursor of planar coating film 231 (a heat-resistant film) and side-surface coating film 232 (an outflow suppression film). The application material can be prepared with a conventionally known method. A general agitator (for example, "Clearmix" manufactured by M Technique Co., Ltd.) can be employed for mixing.

The heat-resistant particles may be inorganic particles. The inorganic particles may be, for example, α alumina (α-$Al_2O_3$) particles, boehmite ($Al_2O_3 \cdot H_2O$) particles, aluminum hydroxide ($Al(OH)_3$) particles, zirconia ($ZrO_2$) particles, titania ($TiO_2$) particles, magnesia (MgO) particles, and magnesium hydroxide ($Mg(OH)_2$) particles.

The heat-resistant particles may be heat-resistant organic particles. The organic particles may be, for example, polyimide (PI) particles. The heat-resistant particles may have an average particle size, for example, from 0.1 to 3 μm. A single type of heat-resistant particles may be used alone, or two or more types of heat-resistant particles may be used as being combined.

Thermoplastic resin particles 1 are particles of a thermoplastic resin. Thermoplastic resin particles 1 may have an average particle size, for example, from 0.1 to 10 μm. A shape of thermoplastic resin particles 1 should not particularly be limited. Thermoplastic resin particles 1 can be spherical or in a form of a plate or a needle. Thermoplastic resin particles 1 may contain, for example, pores.

Thermoplastic resin particles 1 have a prescribed melting point. The "melting point" herein represents a melt peak temperature in a differential scanning calorimetry (DSC) curve measured in conformity with "JIS K 7121: Testing Methods for Transition Temperatures of Plastics." Thermoplastic resin particles 1 may have a melting point, for example, between 150 and 400° C. Thermoplastic resin particles 1 may have a melting point, for example, lower than a decomposition temperature of a binder contained in negative electrode composite material layer 220.

Thermoplastic resin particles 1 may be, for example, at least one type selected from the group consisting of polypropylene (PP) particles, polyvinyl alcohol (PVA) particles, polyvinylidene chloride (PVDC) particles, polyethylene terephthalate (PET) particles, polybutylene terephthalate (PBT) particles, polyether imide (PEI) particles, polytetrafluoroethylene (PTFE) particles, polyamide (PA) particles, polysulfone (PS) particles, polyamide-imide (PAI) particles, polyacetal (POM) particles, polycarbonate (PC) particles, and polyphenylene sulfide (PPS) particles.

A binder may be blended in the application material. The binder may be dissolved in a solvent. The binder may be, for example, polyvinylidene difluoride (PVdF), a vinylidene difluoride-hexafluoropropylene copolymer (PVdF-HFP), polyacrylonitrile (PAN), polyacrylate, polymethacrylate, a styrene-acrylic acid copolymer, an acrylic acid-acrylate copolymer, an ethylene-acrylate copolymer, an ethylene-vinyl acetate copolymer, SBR, CMC, and PAA. A single type of the binder may be used alone, or two or more types of the binder may be used as being combined. The binder desirably has a decomposition temperature higher than the melting point of thermoplastic resin particles 1.

A solid content of the application material may be set, for example, to "heat-resistant particles:thermoplastic resin particles:binder=80 to 92:4 to 18:2 to 4" in mass ratio. A solvent is selected depending on a type of a binder. For example, N-methyl-2-pyrrolidone (NMP) can be employed for a styrene-acrylic acid copolymer. A solid content of the application material is adjusted as appropriate depending on an application method. A solid content of the application material may be, for example, from 40 to 70 mass %.

«(a3) Formation of Planar Coating Film and Side-Surface Coating Film»

Figure 4:
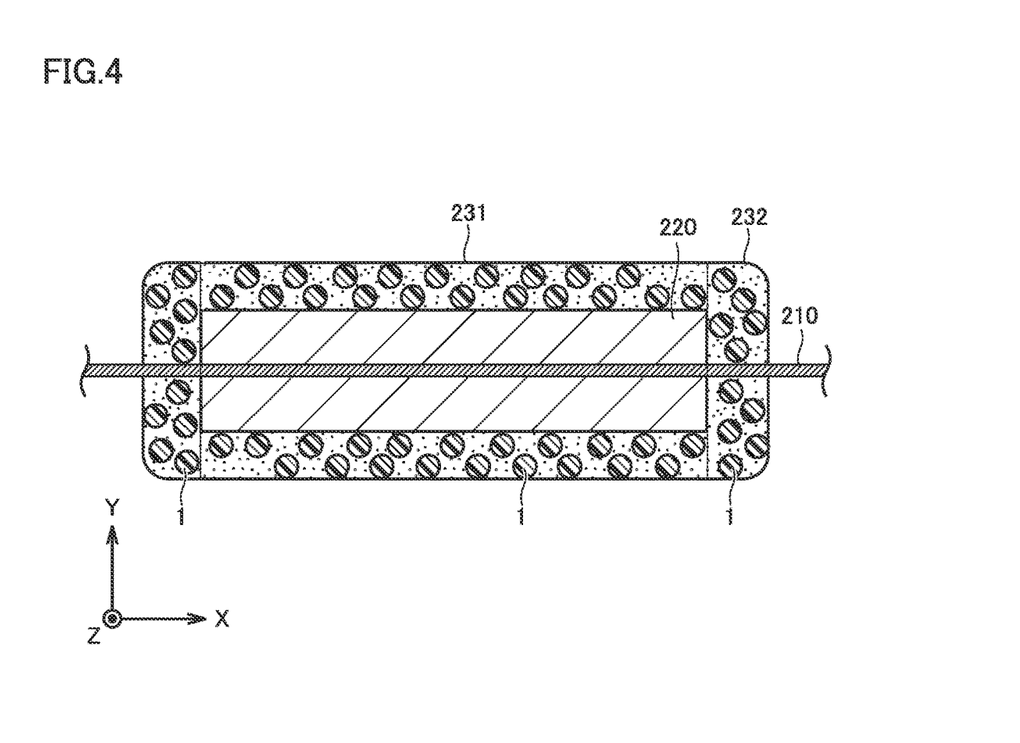
FIG. 4 is a schematic cross-sectional view for illustrating formation of a planar coating film and a side-surface coating film.

FIG. 4 is a schematic cross-sectional view for illustrating formation of the planar coating film and the side-surface coating film. The method of manufacturing a negative electrode for a non-aqueous electrolyte secondary battery in the present embodiment includes forming planar coating film 231 by applying the application material to planar region 221 and forming side-surface coating film 232 by applying the application material to side-surface region 222. The application material can be applied, for example, with a gravure coater.

The application material is applied to planar region 221 and side-surface region 222 (see FIG. 3). The application material can be applied to cover substantially the entire surface of negative electrode composite material layer 220. Planar coating film 231 and side-surface coating film 232 can thus be formed. Planar coating film 231 and side-surface coating film 232 may be integrated with or separate from each other.

«(a4) Heating of Planar Coating Film»

Figure 5:
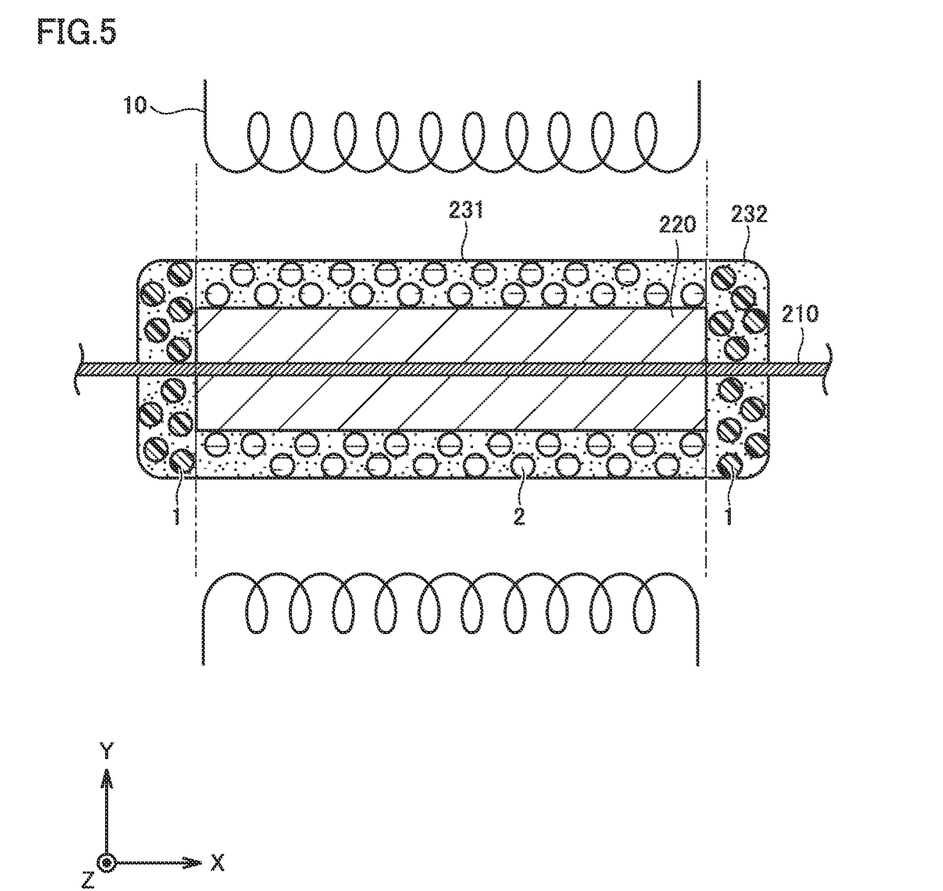
FIG. 5 is a schematic cross-sectional view for illustrating heating of the planar coating film.

FIG. 5 is a schematic cross-sectional view for illustrating heating of the planar coating film. The method of manufacturing a negative electrode for a non-aqueous electrolyte secondary battery in the present embodiment includes melting at least some of thermoplastic resin particles 1 into a melt 2 by heating planar coating film 231 at a temperature not lower than the melting point of thermoplastic resin particles 1. Substantially all thermoplastic resin particles 1 may be molten into melt 2. Some of thermoplastic resin particles 1 may be molten into melt 2. By melting at least some of thermoplastic resin particles 1 into melt 2, pores 3 are considered to be provided when melt 2 is solidified (see FIG. 7).

A manner of heating is desirably such that planar coating film 231 is selectively heated and side-surface coating film 232 is less likely to be heated. For example, IH is suitable. Planar coating film 231 may be heated at a temperature not lower than the melting point of thermoplastic resin particles 1 through induction heating. Heating, however, should not be limited to IH.

In IH, an eddy current is generated in a heated object as a result of change in magnetic fluxes created by a coil 10. The heated object generates heat by itself owing to the eddy current. The eddy current tends to be concentrated in a region in the heated object where coil 10 is reflected as a mirror image. Therefore, it is considered that a heated area can be adjusted depending on a shape of a coil. A temperature of a heated portion can be measured, for example, with a two-color radiation thermometer.

Planar coating film 231 is heated at a temperature not lower than the melting point of thermoplastic resin particles 1. At least some of thermoplastic resin particles 1 can thus be molten into melt 2. Planar coating film 231 may be heated, for example, to a temperature higher by approximately 40° C. or 20° C. than the melting point of thermoplastic resin particles 1. When planar coating film 231 contains a binder, planar coating film 231 is desirably heated at a temperature lower than the decomposition temperature of the binder. A time period for heating may be set, for example, to approximately one second to one minute.

«(a5) Drying of Planar Coating Film and Side-Surface Coating Film»

Figure 6:
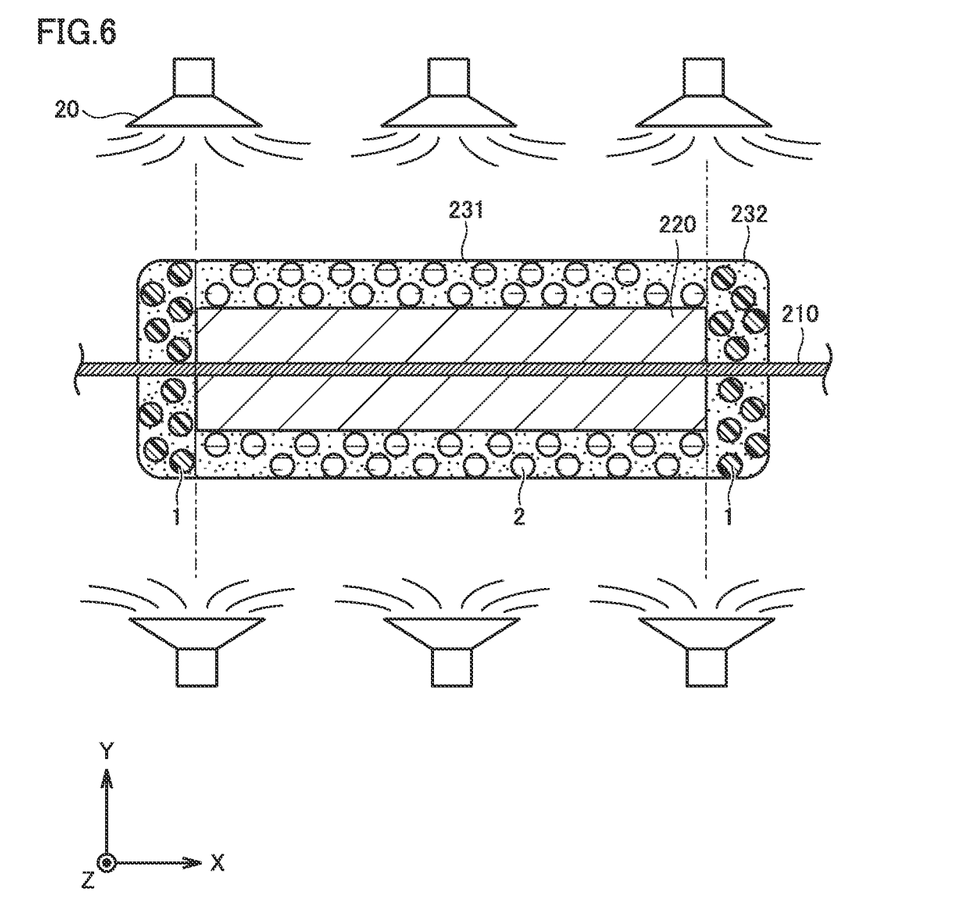
FIG. 6 is a schematic cross-sectional view for illustrating drying of the planar coating film and the side-surface coating film.

FIG. 6 is a schematic cross-sectional view for illustrating drying of the planar coating film and the side-surface coating film. The method of manufacturing a negative electrode for a non-aqueous electrolyte secondary battery in the present embodiment includes manufacturing negative electrode 200 by drying planar coating film 231 containing melt 2 and side-surface coating film 232 containing thermoplastic resin particles 1 at a temperature lower than the melting point of thermoplastic resin particles 1. Melt 2 is solidified through drying. Pores 3 are thus provided in planar coating film 231. "Drying" herein means volatilization of at least some of the solvent. Substantially the whole solvent is desirably volatilized through drying.

So long as planar coating film 231 and side-surface coating film 232 are dried at a temperature lower than the melting point of thermoplastic resin particles 1, planar coating film 231 and side-surface coating film 232 may be, for example, air-dried. From a point of view of decrease in required time, hot air 20 may be used. Namely, planar coating film 231 containing melt 2 and side-surface coating film 232 containing thermoplastic resin particles 1 may be dried at a temperature lower than the melting point of thermoplastic resin particles 1 with hot air 20. Planar coating film 231 and side-surface coating film 232 may be dried, for example, at a temperature lower by approximately 20° C. than the melting point of thermoplastic resin particles 1.

When negative electrode composite material layer 220 is uncompressed at this time point, planar coating film 231 and negative electrode composite material layer 220 may be compressed together after drying. For example, a roller can be used for compression.

Figure 7:
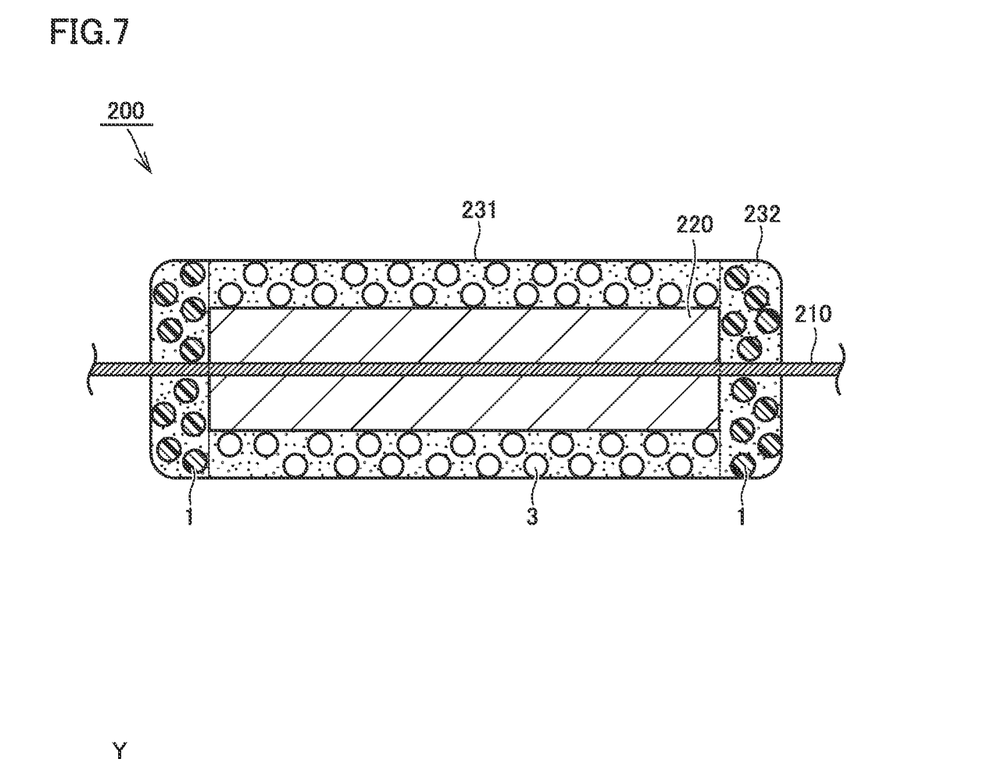
FIG. 7 is a schematic cross-sectional view showing one example of a construction of a negative electrode for a non-aqueous electrolyte secondary battery in the present embodiment.

FIG. 7 is a schematic cross-sectional view showing one example of a construction of a negative electrode for a non-aqueous electrolyte secondary battery in the present embodiment. Negative electrode 200 includes negative electrode composite material layer 220. Negative electrode composite material layer 220 includes planar region 221 and side-surface region 222 (see FIG. 3). Planar coating film 231 is formed to cover planar region 221. Side-surface coating film 232 is formed to cover side-surface region 222. Planar coating film 231 and side-surface coating film 232 may each have a thickness, for example, from 0.5 to 10 μm. Planar coating film 231 contains a plurality of pores 3. Namely, planar coating film 231 is porous. Therefore, planar coating film 231 can function as a heat-resistant film. Side-surface coating film 232 includes thermoplastic resin particles 1. Few pores are provided in side-surface coating film 232. Therefore, side-surface coating film 232 can function as an outflow suppression film. Negative electrode 200 is used as being cut into a prescribed shape (for example, like a band).

<(B) Manufacturing of Positive Electrode>

Figure 8:
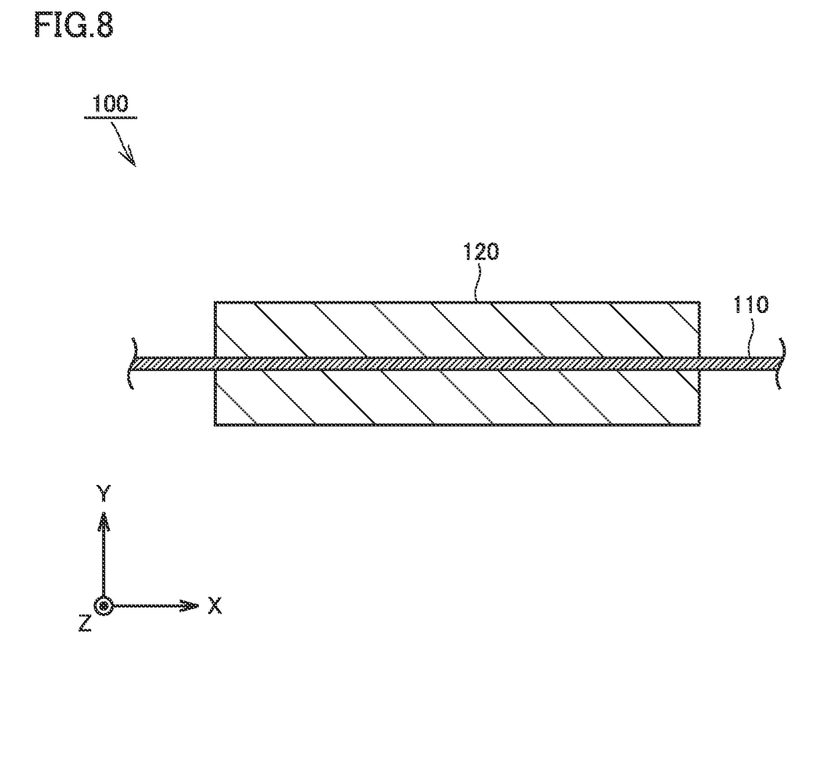
FIG. 8 is a schematic cross-sectional view showing one example of a construction of a positive electrode.

FIG. 8 is a schematic cross-sectional view showing one example of a construction of a positive electrode. The method of manufacturing a non-aqueous electrolyte secondary battery in the present embodiment includes manufacturing a positive electrode 100 including a positive electrode composite material layer 120. The method of manufacturing a positive electrode should not particularly be limited. The positive electrode can be manufactured with a conventionally known method.

For example, slurry can be prepared by mixing a positive electrode active material, a conductive material, a binder, and a solvent. Slurry can be applied to a surface of a positive electrode current collector 110, for example, with a die coater and then dried. Positive electrode composite material layer 120 can thus be formed. Namely, positive electrode 100 including positive electrode composite material layer 120 can be manufactured. Positive electrode composite material layer 120 may be compressed after drying. Positive electrode 100 can be used as being cut into a prescribed shape (for example, like a band).

Positive electrode current collector 110 may be formed, for example, from an aluminum (Al) foil. The Al foil may be a pure Al foil or an Al alloy foil. Positive electrode current collector 110 can have a thickness, for example, from 10 to 30 μm.

Positive electrode composite material layer 120 can be formed to have a thickness, for example, from 10 to 100 μm. Positive electrode composite material layer 120 can be formed to contain, for example, 80 to 98 mass % of positive electrode active material, 1 to 15 mass % of conductive material, and 1 to 5 mass % of binder. The positive electrode active material should not particularly be limited. The positive electrode active material may be, for example, $LiCoO_2$, $LiNiO_2$, $LiMnO_2$, $LiNi_{1/3}Co_{1/3}Mn_{1/3}O_2$, $LiMn_2O_4$, and $LiFePO_4$. The conductive material should not particularly be limited either. The materials exemplified as the conductive material for negative electrode composite material layer 220 can be used as the conductive material. The binder should not particularly be limited either. The binder may be, for example, PVdF, PTFE, and PAA. For each of the positive electrode active material, the conductive material, and the binder, a single type may be used alone or two or more types may be used as being combined. A solvent can be selected as appropriate depending on a type of a binder. For example, NMP can be used for PVdF.

<(C) Formation of Electrode Group>

Figure 9:
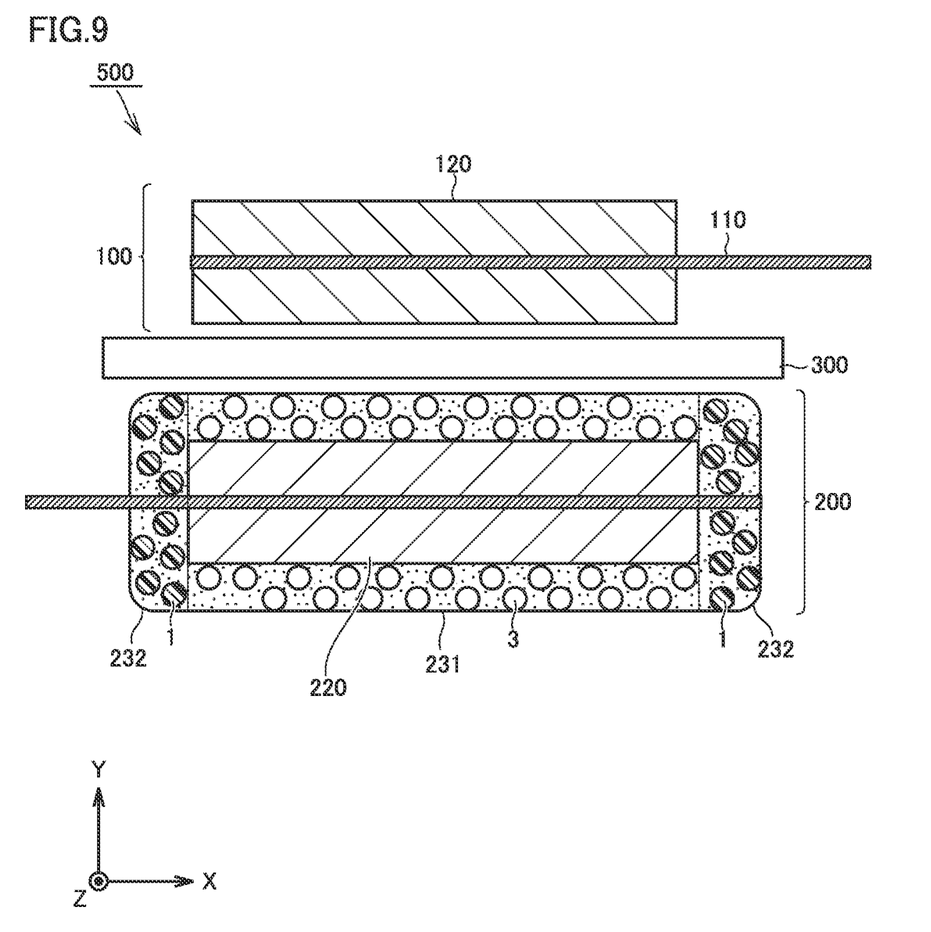
FIG. 9 is a schematic cross-sectional view showing one example of a construction of an electrode group.

FIG. 9 is a schematic cross-sectional view showing one example of a construction of an electrode group. The method of manufacturing a non-aqueous electrolyte secondary battery in the present embodiment includes forming an electrode group 500 by stacking positive electrode 100 and negative electrode 200 such that positive electrode composite material layer 120 and planar coating film 231 are opposed to each other.

A separator 300 may be arranged between positive electrode 100 and negative electrode 200. Separator 300 is an electrically insulating porous film. Separator 300 can be made, for example, of PP or polyethylene (PE). Separator 300 may be made up, for example, by stacking a PP porous film, a PE porous film, and a PP porous film in this order. Separator 300 may have a thickness, for example, from 10 to 30 μm.

Electrode group 500 may be formed by stacking positive electrode 100 in a form of a band and negative electrode 200 in a form of a band and further spirally winding the positive electrode and the negative electrode. Electrode group 500 may be formed by alternately stacking positive electrode 100 and negative electrode 200.

<(D) Impregnation with Electrolyte>

Figure 10:
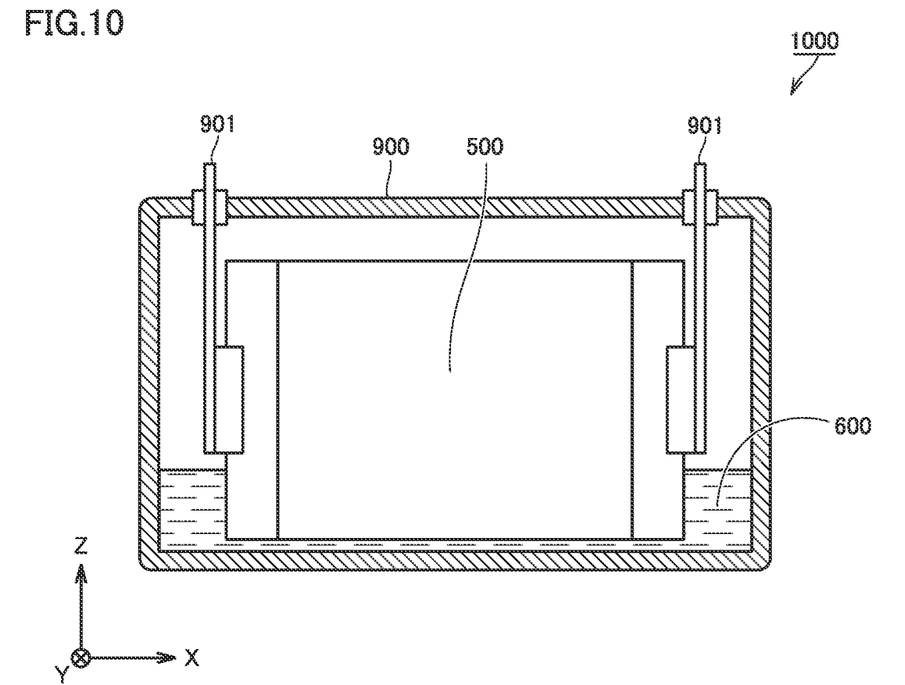
FIG. 10 is a schematic cross-sectional view showing one example of a construction of a non-aqueous electrolyte secondary battery in the present embodiment.

FIG. 10 is a schematic cross-sectional view showing one example of a construction of a non-aqueous electrolyte secondary battery in the present embodiment. The method of manufacturing a non-aqueous electrolyte secondary battery in the present embodiment includes manufacturing a non-aqueous electrolyte secondary battery 1000 by impregnating electrode group 500 with an electrolyte 600. By impregnating electrode group 500 with electrolyte 600, negative electrode composite material layer 220 is also impregnated with electrolyte 600.

For example, initially, electrode group 500 is accommodated in a prescribed battery case 900. Electrode group 500 is electrically connected to an external terminal 901. Battery case 900 may be, for example, a case made of a metal. The case made of a metal may be, for example, prismatic (a parallelepiped of a flat profile) or cylindrical. Battery case 900 may be made, for example, of an Al alloy. Battery case 900 may be, for example, a pouch made of an aluminum laminated film. Battery case 900 may include a liquid introduction hole, a current interrupt device (CID), and a gas exhaust valve.

A prescribed amount of electrolyte 600 is introduced into battery case 900. Electrode group 500 is impregnated with the electrolyte. After electrolyte 600 is introduced, battery case 900 is hermetically sealed. Non-aqueous electrolyte secondary battery 1000 can be manufactured as set forth above.

Electrolyte 600 is a non-aqueous electrolyte. Electrolyte 600 contains lithium (Li) salt and a solvent. The Li salt is dissolved in the solvent. The Li salt functions as a supporting electrolyte. Electrolyte 600 may contain, for example, 0.5 to 2 mol/l of Li salt. The Li salt may be, for example, $LiPF_6$, $LiBF_4$, $Li[N(FSO_2)_2]$, and $Li[N(CF_3SO_2)_2]$. A single type of Li salt may be used alone, or two or more types of Li salt may be used as being combined.

The solvent is aprotic. The solvent may be a mixed solvent of cyclic carbonate and chain carbonate. A ratio of mixing between cyclic carbonate and chain carbonate may be set, for example, to "cyclic carbonate:chain carbonate=1:9 to 5:5" in volume ratio. Examples of cyclic carbonate include ethylene carbonate (EC), propylene carbonate (PC), butylene carbonate (BC), and fluoroethylene carbonate (FEC). Examples of chain carbonate include dimethyl carbonate (DMC), ethyl methyl carbonate (EMC), and diethyl carbonate (DEC). For each of cyclic carbonate and chain carbonate, a single type may be used alone or two or more types may be used as being combined.

The solvent may include, for example, lactone, cyclic ether, chain ether, and carboxylate. Examples of lactone include γ-butyrolactone (GBL) and δ-valerolactone. Examples of cyclic ether include tetrahydrofuran (THF), 1,3-dioxolane, and 1,4-dioxane. Examples of chain ether include 1,2-dimethoxyethane (DME). Examples of carboxylate include methyl formate (MF), methyl acetate (MA), and methyl propionate (MP).

Electrolyte 600 can contain various functional additives in addition to the Li salt and the solvent. Electrolyte 600 may contain, for example, 1 to 5 mass % of functional additive. Examples of the functional additive include a gas generating agent (an overcharge additive) and a coating film forming agent. Examples of the gas generating agent include cyclohexylbenzene (CHB) and biphenyl (BP). Examples of the coating film forming agent include vinylene carbonate (VC), vinyl ethylene carbonate (VEC), $Li[B(C_2O_4)_2]$, $LiPO_2F_2$, propane sultone (PS), and ethylene sulfite (ES).

<Applications>

Expansion and contraction of negative electrode composite material layer 220, that is, outflow of electrolyte 600 from negative electrode composite material layer 220, tends to be noticeable in a high-rate cycle. In non-aqueous electrolyte secondary battery 1000 in the present embodiment, side-surface coating film 232 can suppress outflow of electrolyte 600. Namely, non-aqueous electrolyte secondary battery 1000 in the present embodiment is expected to exhibit excellent high-rate cycle characteristics.

Examples of applications in which a high-rate cycle is required include a power supply for a hybrid vehicle (HV), a plug-in hybrid vehicle (PHV), an electric vehicle (EV), and the like. Namely, non-aqueous electrolyte secondary battery 1000 in the present embodiment is particularly suitable for such vehicle-mount applications. Applications of non-aqueous electrolyte secondary battery 1000 in the present embodiment should not be limited to the vehicle-mount applications. Non-aqueous electrolyte secondary battery 1000 in the present embodiment is applicable to every application.

EXAMPLES

Examples of the present disclosure will be described below. Examples below, however, do not limit the scope of claims.

Example 1

1. (A) Manufacturing of Negative Electrode 1-1. (a1) Formation of Negative Electrode Composite Material Layer Materials below were prepared.
Negative electrode active material: natural graphite
Binder: CMC
Solvent: water (ion exchanged water)
Negative electrode current collector: Cu foil The negative electrode active material, the binder, and the solvent were mixed in an agitator. Wet granules were thus prepared. A solid content of the wet granules was set to 70 mass %. A composition of the solid content of the wet granules was set to "negative electrode active material:binder=99:1" in mass ratio.

The wet granules were applied to a surface of the negative electrode current collector with a roll coater and then dried. A negative electrode composite material layer including the planar region and the side-surface region was thus formed.

1-2. (a2) Preparation of Application Material

Materials below were prepared.
Heat-resistant particles: α alumina
Thermoplastic resin particles: PP particles (having a melting point of 160° C.)
Binder: styrene-acrylic acid copolymer
Solvent: NMP The heat-resistant particles, the thermoplastic resin particles, the binder, and the solvent were mixed in an agitator. The application material was thus prepared. A composition of a solid content of the application material was set to "heat-resistant particles:thermoplastic resin particles:binder=90:6:4" in mass ratio. A solid content of the application material was set to 45 mass %.

1-3. (a3) Formation of Planar Coating Film and Side-Surface Coating Film

The application material was applied with a gravure coater to cover the entire surface of the negative electrode composite material layer (undried). The planar coating film was formed by applying the application material to the planar region and the side-surface coating film was formed by applying the application material to the side-surface region.

1-4. (a4) Heating of Planar Coating Film

The planar coating film was heated through IH at 200° C. At least some of the thermoplastic resin particles were thus molten into a melt. The temperature of 200° C. is a temperature not lower than the melting point (160° C.) of PP particles.

1-5. (a5) Drying of Planar Coating Film and Side-Surface Coating Film

The planar coating film containing the melt and the side-surface coating film containing the thermoplastic resin particles were dried at 140° C. The negative electrode composite material layer was also dried at this time. Hot air was used for drying. The temperature of 140° C. is a temperature lower than the melting point (160° C.) of the PP particles. The negative electrode was manufactured as set forth above. The negative electrode was rolled and cut into a prescribed dimension.

2. (B) Manufacturing of Positive Electrode

Materials below were prepared.
Positive electrode active material: $LiNi_{1/3}Co_{1/3}Mn_{1/3}O_2$
Conductive material: acetylene black
Binder: PVdF
Solvent: NMP
Positive electrode current collector: Al foil The positive electrode active material, the conductive material, the binder, and the solvent were mixed in an agitator. Slurry was thus prepared. The slurry was applied to a surface of the positive electrode current collector with a die coater and then dried. A positive electrode including a positive electrode composite material layer was thus manufactured. The positive electrode was rolled and cut into a prescribed dimension.

3. (C) Formation of Electrode Group

A separator made of PE was prepared. The positive electrode and the negative electrode were stacked such that the planar coating film and the positive electrode composite material layer were opposed to each other with the separator being interposed. The electrode group was thus formed.

4. (D) Impregnation with Electrolyte

A pouch made of a laminated film was prepared as a battery case. The electrode group was accommodated in the battery case. A prescribed electrolyte was introduced into the battery case. The electrode group was thus impregnated with the electrolyte. The battery case was hermetically sealed by a heat sealer, A non-aqueous electrolyte secondary battery (a lithium ion secondary battery) was manufactured as set forth above.

Comparative Example 1

An application material was prepared as in Example 1 except for not using thermoplastic resin particles. The planar coating film and the side-surface coating film were formed by applying the application material to the planar region and the side-surface region. The planar coating film and the side-surface coating film were dried with hot air at 140° C. The non-aqueous electrolyte secondary battery was manufactured as in Example 1 except for these aspects.

Examples 2 and 3 and Comparative Examples 2 to 4

Non-aqueous electrolyte secondary batteries were manufactured as in Example 1 except that a temperature in IH and a temperature in drying with hot air were varied as shown in Table 1 below.

<Evaluation>

1. Initial Resistance

An internal resistance (initial resistance) of the battery was measured with a direct current method. Table 1 shows results. It is assumed that the initial resistance is lower as there are larger number of pores in the planar coating film.

2. Rate of Increase in Resistance after High-Rate Cycle

Three thousand cycles of charging and discharging were repeated within a range of states of charge (SOC) from 50 to 60% and with a current of 20 C. Here, "1 C" represents a current at which a full charge capacity of a battery is discharged in one hour. After the cycle, an internal resistance of the battery was measured similarly to the initial resistance. A rate of increase in resistance was calculated by dividing the internal resistance after the cycle by the initial resistance. Table 1 shows results. It is assumed that a rate of increase in resistance is lower as an effect of suppression of outflow of the electrolyte by the side-surface coating film is higher.

TABLE 1

List of Examples and Comparative Examples

| | Method of Manufacturing Negative Electrode for Non-Aqueous Electrolyte Secondary Battery | | | Evaluation | |
|---|---|---|---|---|---|
| | (a2) Preparation of Application Material | (a4) Heating of Planar Coating Film | (a5) Drying of Planar Coating Film and Side-Surface Coating Film | Initial Resistance [mΩ] | Rate of Increase in Resistance After High-Rate Cycle [%] |
| Comparative Example 1 | Not containing thermoplastic resin particles | — | Hot air: 140° C. | 340 | 146 |
| Comparative Example 2 | PP particles (Melting point: 160° C.) | IH: 140° C. | Hot air: 140° C. | 630 | 108 |
| Comparative Example 3 | PP particles (Melting point: 160° C.) | IH: 200° C. | Hot air: 180° C. | 324 | 142 |
| Comparative Example 4 | PP particles (Melting point: 160° C.) | IH: 140° C. | Hot air: 180° C. | 332 | 144 |
| Example 1 | PP particles (Melting point: 160° C.) | IH: 200° C. | Hot air: 140° C. | 334 | 105 |
| Example 2 | PP particles (Melting point: 160° C.) | IH: 180° C. | Hot air: 140° C. | 329 | 104 |
| Example 3 | PP particles (Melting point: 160° C.) | IH: 160° C. | Hot air: 140° C. | 326 | 105 |

<Results>

Comparative Example 1 is high in rate of increase in resistance. In Comparative Example 1, neither of the planar coating film and the side-surface coating film contains thermoplastic resin particles. Namely, both of the planar coating film and the side-surface coating film are considered as porous. Therefore, it is assumed that the electrolyte flowed out of the negative electrode composite material layer during the high-rate cycle.

Comparative Example 2 is high in initial resistance. It is assumed that there were few pores in the planar coating film because the planar coating film was heated at a temperature lower than the melting point of the thermoplastic resin particles in Comparative Example 2. It is thus assumed that exchange of Li ions between the positive electrode composite material layer and the negative electrode composite material layer was blocked.

Comparative Examples 3 and 4 are high in rate of increase in resistance. It is assumed that pores were formed also in the side-surface coating film because the side-surface coating film was heated at a temperature equal to or higher than the melting point of the thermoplastic resin particles during drying in Comparative Examples 3 and 4. Therefore, it is assumed that the electrolyte flowed out of the negative electrode composite material layer during the high-rate cycle.

Examples 1 to 3 are low in initial resistance and low in rate of increase in resistance. It is assumed that exchange of Li ions between the positive electrode composite material layer and the negative electrode composite material layer was less likely to be blocked because pores were formed in the planar coating film in Examples 1 to 3. Furthermore, it is assumed that outflow of the electrolyte was suppressed during the high-rate cycle because there were few pores in the side-surface coating film in Examples 1 to 3.

It should be understood that the embodiment disclosed herein is illustrative and non-restrictive in every respect. The technical scope defined by the terms of the claims is intended to include any modifications within the scope and meaning equivalent to the terms of the claims.

What is claimed is:

1. A method of manufacturing a negative electrode for a non-aqueous electrolyte secondary battery comprising:
    forming a negative electrode composite material layer including a planar region and a side-surface region;
    preparing an application material by mixing heat-resistant particles, thermoplastic resin particles, and a solvent;
    forming a planar coating film by applying the application material to the planar region and forming a side-surface coating film by applying the application material to the side-surface region;
    melting at least some of the thermoplastic resin particles into a melt by heating the planar coating film at a temperature not lower than a melting point of the thermoplastic resin particles; and
    manufacturing a negative electrode by drying the planar coating film containing the melt and the side-surface coating film containing the thermoplastic resin particles at a temperature lower than the melting point of the thermoplastic resin particles.

2. The method of manufacturing a negative electrode for a non-aqueous electrolyte secondary battery according to claim 1, wherein
    the planar coating film is heated at the temperature not lower than the melting point of the thermoplastic resin particles through induction heating.

3. The method of manufacturing a negative electrode for a non-aqueous electrolyte secondary battery according to claim 2, wherein
    the planar coating film containing the melt and the side-surface coating film containing the thermoplastic resin particles are dried at the temperature lower than the melting point of the thermoplastic resin particles with hot air.

4. The method of manufacturing a negative electrode for a non-aqueous electrolyte secondary battery according to claim 1, wherein
    the negative electrode composite material layer is formed of wet granules.

5. A method of manufacturing a non-aqueous electrolyte secondary battery comprising:
    manufacturing the negative electrode with the method of manufacturing a negative electrode for a non-aqueous electrolyte secondary battery according to claim 1;
    manufacturing a positive electrode including a positive electrode composite material layer;
    forming an electrode group by stacking the positive electrode and the negative electrode such that the positive electrode composite material layer and the planar coating film are opposed to each other; and
    manufacturing a non-aqueous electrolyte secondary battery by impregnating the electrode group with an electrolyte.

6. The method of manufacturing a negative electrode for a non-aqueous electrolyte secondary battery according to claim 1, wherein
    the side-surface region is not perpendicular to the planar region.

7. The method of manufacturing a negative electrode for a non-aqueous electrolyte secondary battery according to claim 1, wherein
    the side-surface region is inclined with reference to the planar region.

* * * * *